(12) United States Patent
Yen

(10) Patent No.: US 7,225,490 B1
(45) Date of Patent: Jun. 5, 2007

(54) MULTI-FUNCTIONAL WIRE STRIPPER

(76) Inventor: Chao-Chin Yen, No. 14, Lane 56, Sec. 1, Chung Hua Rd., Tucheng City, Taipei (TW)

( * ) Notice: Subject to any disclaimer, the term of this patent is extended or adjusted under 35 U.S.C. 154(b) by 0 days.

(21) Appl. No.: 11/486,014

(22) Filed: Jul. 14, 2006

(51) Int. Cl.
*B25F 1/00* (2006.01)
*B25B 15/00* (2006.01)
*B25F 1/02* (2006.01)

(52) U.S. Cl. .............................................. 7/107; 7/165
(58) Field of Classification Search ................... 7/107, 7/158, 165
See application file for complete search history.

(56) References Cited

U.S. PATENT DOCUMENTS

| | | | | |
|---|---|---|---|---|
| 4,081,871 A | * | 4/1978 | Knuth | 7/107 |
| 4,660,241 A | * | 4/1987 | Chen et al. | 7/107 |
| 5,140,873 A | * | 8/1992 | Schwartzman | 81/9.43 |
| 5,205,006 A | * | 4/1993 | Panasuk | 7/108 |
| 5,735,005 A | * | 4/1998 | Wang | 7/127 |
| 7,114,825 B1 | * | 10/2006 | Bauman | 362/119 |

* cited by examiner

*Primary Examiner*—David B. Thomas
(74) *Attorney, Agent, or Firm*—Rosenberg, Klein & Lee

(57) ABSTRACT

A multi-functional wire stripper includes a fixing element, a movable element, a wire-stripping module, an electrical sensor, and a flexible element. There is a fixing sleeve on the front end of the fixing element for installing a tool module. The movable element is installed at the fixing element. The wire-stripping module is installed between the fixing element and the movable element. The electrical sensor is installed at the fixing element. The flexible element is installed between the fixing element and the movable element. Thereby, the wire stripper is capable of stripping the insulating layer off electrical cords and cutting electrical cords. The wire stripper is easy to operate, and reduces the time taken to perform such an action. The quantity of tools required by a workman are therefore reduced. If an electrical device leaks electricity, the wire stripper can inform the user thereby preventing them receiving an electrical shock.

9 Claims, 3 Drawing Sheets

MULTI-FUNCTIONAL WIRE STRIPPER

BACKGROUND OF THE INVENTION

1. Field of the Invention

The present invention relates to a wire stripper. In particular, this invention relates to a wire stripper that comprises a tool module and an electrical sensor.

2. Description of the Related Art

Wire strippers are essential tools for plumbing and electrical engineering. Wire strippers are used for stripping the insulating layer of coaxial electric cables, bus wires, or electric cords, or cutting the bus wires or electric cords. As shown in FIG. 1, a wire stripper of the prior art includes a first element 91, a second element 92, and a pivoting element 93 for pivoting the first element 91 and the second element 92 at the middle location. A handle 94 is individually installed at the lower end of the first element 91 and the second element 92. There are a plurality of concaves 95 or convexes 96 on the first element 91 and the second element 92. The concaves 95 or convexes 96 are located under the pivoting element 93 and are used for extruding pins or stripping the insulating layer of electric cords. There is a knife-edge 97 on the inner side of the top of the first element 91. The knife-edge 97 is driven by the two handles 94 so as to press on a plate-shaped contacting part 98 located at the top of the second element 92 for cutting electric cords.

Good tools are a prerequisite for the successful execution of a job. A lot of handheld tools are essential for executing plumbing and electrical engineering. Workmen always carry a lot of handheld tools, such as wire strippers, screwdrivers, hexagonal screwdrivers etc, in their toolbox. Therefore, the toolbox is heavy. A wire stripper is usually used whenever a user needs to strip the insulating layer of an electric cord. Having done that, the user then puts the wire stripper down and uses a screwdriver to fasten the conducting layer of the electric cords in the socket. When the wire stripper is adopted, the user needs to put the screwdriver down again. This is a time-consuming process. Furthermore, a lot of handheld tools occupy large amounts of space in a toolbox and the weight of the toolbox is heavy. It is also inconvenient to carry the tools around in the toolbox.

SUMMARY OF THE INVENTION

One particular aspect of the present invention is to provide a multi-functional wire stripper. The wire stripper can strip the insulating layer of a wire or cut the wire. There is a tool module on the side of the wire stripper. It is easy to operate, and reduces the time required to perform operations. The quantity of other handheld tools, occupied space, and weight are removed. When an electrical device is leaking an electrical charge, the multi-functional wire stripper of the present invention can inform the user and prevent the user from getting an electrical shock.

The multi-functional wire stripper includes a fixing element, a movable element, a wire-stripping module, an electrical sensor, and a flexible element. There is a fixing sleeve on the front end of the fixing element for installing the tool module. The fixing element has a first pivoting part, a wedged part, and a first pivoting hole. The movable element has a second pivoting part, a slot, a switch, and a second pivoting hole. The second pivoting part of the movable element is movably installed at the first pivoting part of the fixing element. The switch is movably installed in the slot and the switch is movably wedged on the wedged part of the fixing element. The wire-stripping module is installed between the fixing element and the movable element. The electrical sensor is installed at the fixing element, and there is a sensing element in the electrical sensor and the sensing element is connected with the fixing sleeve. The flexible element is installed between the first pivoting hole of the fixing element and the second pivoting hole of the movable element.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
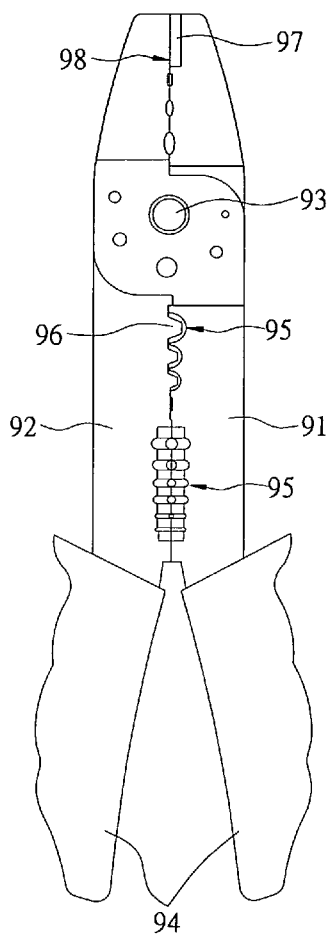
FIG. 1 is a schematic diagram of the wire stripper of the prior art.
Figure 2:
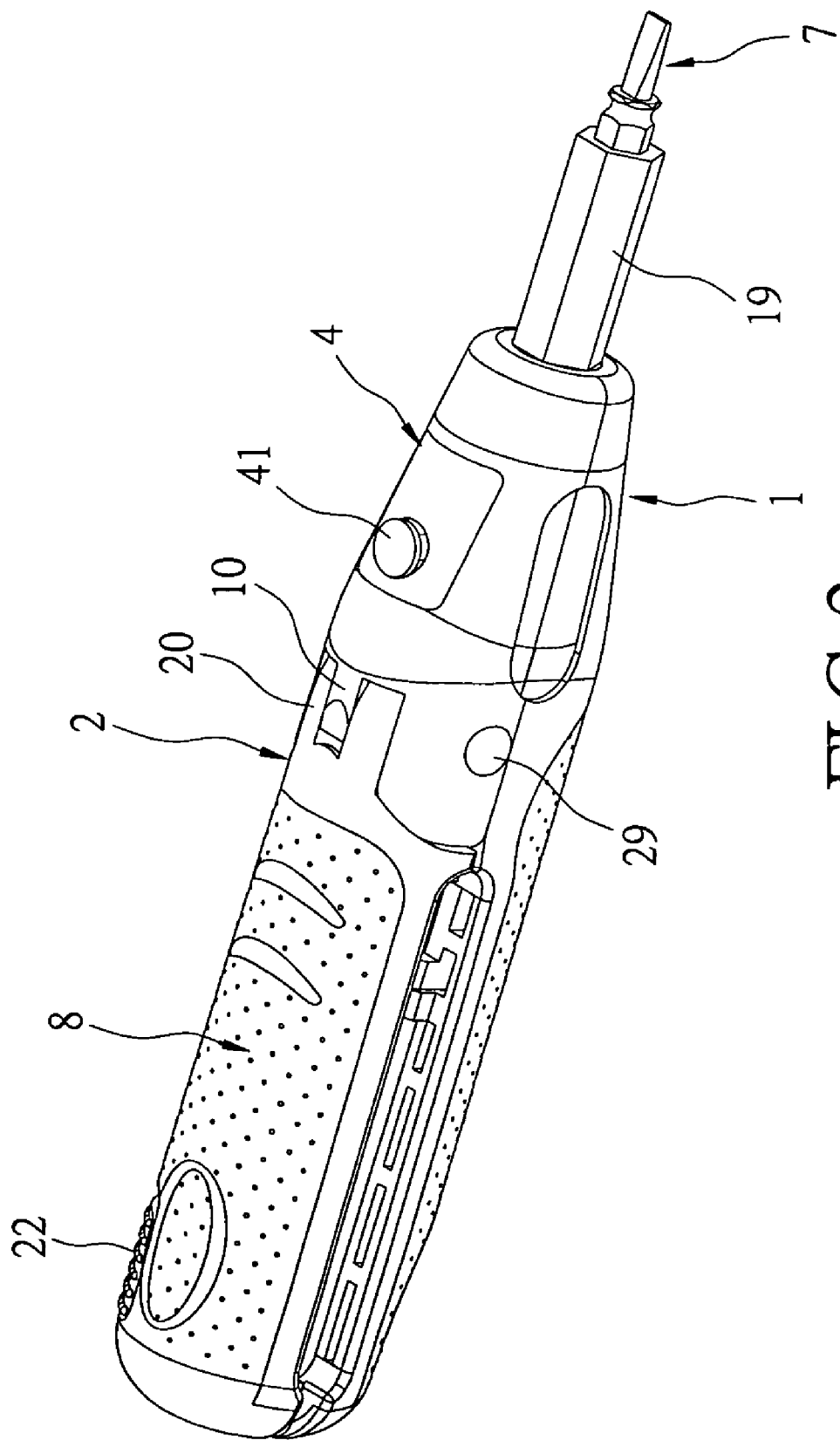
FIG. 2 is a perspective view of the multi-functional wire stripper of the present invention.
Figure 3:
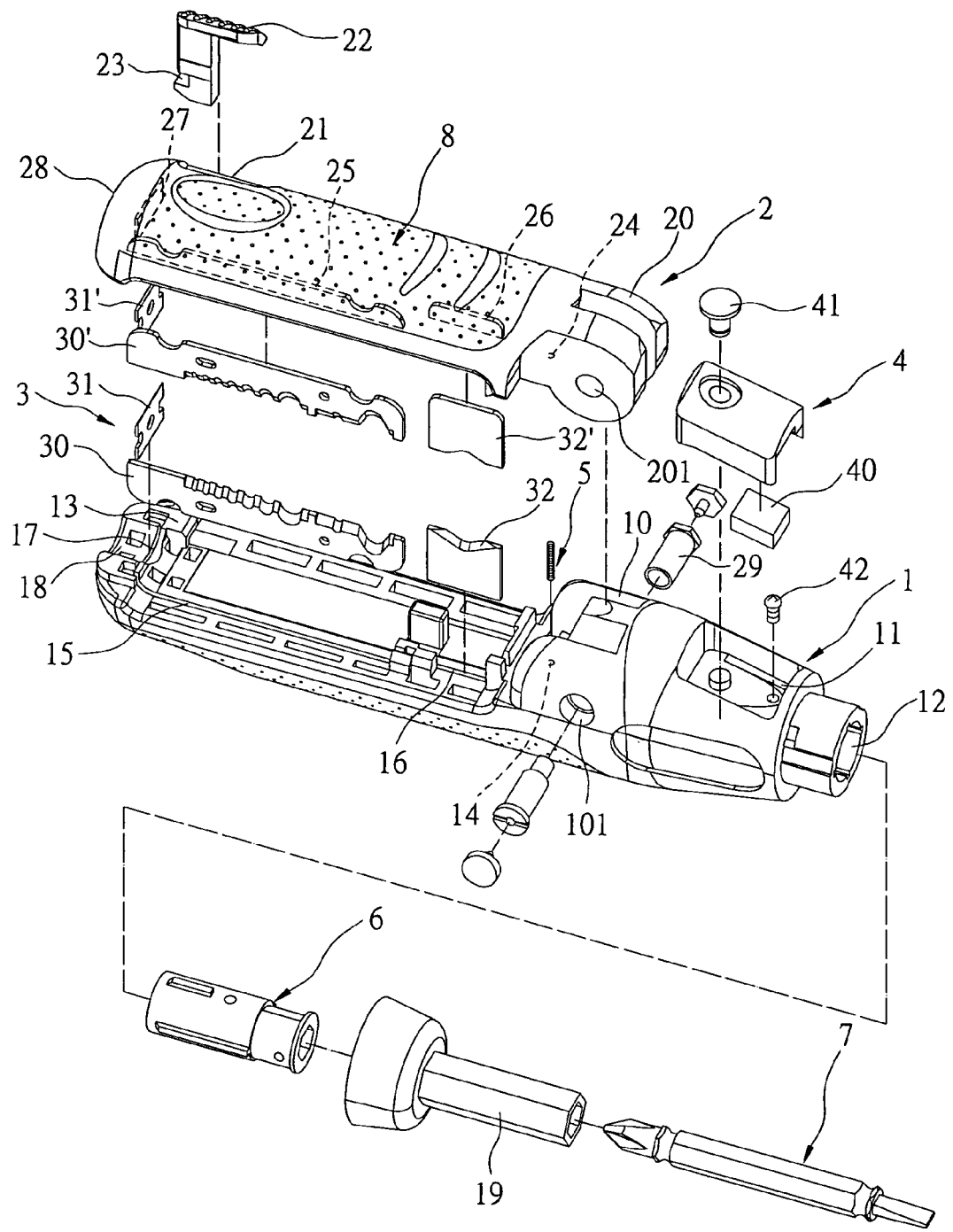
FIG. 3 is an exploded perspective view of the multi-functional wire stripper of the present invention.

Reference is made to FIGS. 2 and 3. The multi-functional wire stripper includes a fixing element 1, a movable element 2, a wire-stripping module 3, an electrical sensor 4, and a flexible element 5. The fixing element 1 and the movable element 2 are handle-shaped. There is a fixing sleeve 6 on the front end of the fixing element 1. The fixing sleeve 6 is installed in the opening hole 12 located at the front end of the fixing element 1. The fixing sleeve 6 is made of a metal, such as stainless steel, aluminum, or copper. The fixing sleeve 6 is movably installed in the inner part of a tool module 7. On the front end of the fixing element 1, there is a positioning sleeve 19 so that the tool module 7 can be movably plugged into the positioning sleeve 19 and is connected in the fixing sleeve 6. The positioning sleeve 19 is used for steadily fastening the tool module 7 and prevents the user from directly contacting the tool module 7 so as to prevent the user from receiving an electric shock. The tool module 7 is a twin-head screwdriver or a hexagonal screwdriver. On an appropriate location of the surface of the fixing element 1 and the movable element 2, there is a slip proof element 8. The two slip proof elements 8 are made of rubber or plastic and are used for gripping or being slip proof.

The fixing element 1 has a first pivoting part 10, a concave slot 11, and a wedged part 13. The first pivoting part 10 is located at the middle part of the fixing element 1, and the first pivoting part 10 has a first through hole 101. The first through hole 101 passes through the first pivoting part 10. The concave slot 11 is located at an appropriate location of the surface of the first pivoting part 10 and has a concave opening shape. The electrical sensor 4 is locked in the concave slot 11 of the fixing element 1 by a fastening element 41 (such as a bolt). The electrical sensor 4 has a sensing element 40. The sensing element 40 is a resistor and a lighting element, or a non-contact voltage sensor and a buzzer and/or a lighting element. The sensing element 40 is electrically connected with a fastening element 41 and a fastening element 42. The bottom of the fastening element 42 is plugged into the fixing element 1 and is connected with the fixing sleeve 6. The wedged part 13 is located at an appropriate location of the rear end of the fixing element 1 and has a convex-block shape.

The movable element 2 has a second pivoting part 20, a slot 21, and a switch 22. The second pivoting part 20 is located at the front end of the movable element 2 and has a second through hole 201. The second through hole 201 passes through the second pivoting part 20. The second through hole 201 of the movable element 2 corresponds to the first through hole 101 of the fixing element 1. The slot 21 is located at an appropriate location at the rear end of the movable element 2. The switch 22 is installed in the slot 21 and can be moved up and down. The switch 22 has a concave opening 23. The slot 21 and the switch 22 correspond to the wedged part 13.

The fixing element 1 and the movable element 2 both have a first pivoting hole 14 and a second pivoting hole 24 that correspond to each other. The flexible element 5 is installed between the first pivoting hole 14 and the second pivoting hole 24. The flexible element 5 is a compressed spring. The movable element 2 is movably installed at the fixing element 1. It is implemented by plugging a pivoting-shaft element 29 into the first through hole 101 of the fixing element 1 and the second through hole 201 of the movable element 2. Therefore, the second pivoting part 20 of the movable element 2 is movably pivoted to the first pivoting part 10 of the fixing element 1 to make the fixing element 1 and the movable element 2 be integrated into a single piece. The movable element 2 moves to a left side and a right side of the fixing element 1 via the flexible element 5 located in the first pivoting hole 14 and the second pivoting hole 24. When the wire stripper is compressed, the concave opening 23 of the switch 22 of the movable element 2 is movably wedged to the wedged part 13 of the fixing element 1 to make the movable element 2 become closed. At this moment, the fixing element 1 and the movable element 2 are in a closed status.

The wire-stripping module 3 includes a pair of first wire-stripping blades 30 and 30', a pair of second wire-stripping blades 31 and 31', a pair of cutting blades 32 and 32'. The pair of first wire-stripping blades 30 and 30' both have a plurality of semi-circular blades that correspond to each other and their diameter is different from each other for stripping cords according to the diameter of the cords. At an appropriate location of the fixing element 1 and the movable element 2, there are long knife slots 15, 25, short knife slots 16, 26, and blade slots 17, 27 that correspond to each other. The long knife slots 15, 25 and the short knife slots 16, 26 are individually located at an appropriate location of the side surface of the fixing element 1 and the movable element 2. The blade slots 17, 27 are individually located at an appropriate location of the rear end of the fixing element 1 and the movable element 2. On the rear end of the fixing element 1 and the movable element 2, there are semi-circular slots 18 and 28. The semi-circular slots 18 and 28 are adjacent to the blade slots 17, 27. The pair of first wire-stripping blades 30 and 30' are individually located in the long knife slots 15, 25. The pair of second wire-stripping blade 31 and 31' are individually located in the blade slots 17, 27. The pair of cutting blades 32 and 32' are individually located in the short knife slots 16, 26.

When a user wants to strip an insulating layer of a cord, the user uses the pair of first wire-stripping blades 30 and 30' to strip the insulating layer according to the dimension of the cords. The user presses the movable element 2 to make the pair of first wire-stripping blades 30 and 30' strip the insulating layer on the fixing element 1 and the movable element 2. When the dimension of the cord is larger than the dimension of the pair of first wire-stripping blades 30 and 30', the user plugs the cord into the semi-circular slots 18 and 28 of the fixing element 1 and the movable element 2 to use the pair of second wire-stripping blade 31 and 31' to strip the insulating layer. When the user wants to cut the cord, the user uses the pair of cutting blades 32 and 32' to cut the cord to obtain a cord of a desired dimension. When the insulating layer is stripped, the user wedges the switch 22 of the movable element 2 to the wedged part 13 of the fixing element 1 so that it becomes closed. Next, the user utilizes the tool module 7 installed by the fixing sleeve 6 to fasten the conducting line of the cord to the related pin. The user does not need to use a conventional screwdriver to screw the conducting line. Therefore, the quantity of handheld tools in a toolbox can be reduced and the occupied space and the weight of the toolbox are also removed. When the conducting line is screwed on the pin, the user receives an electric shock if the pin is leaking electricity. For this embodiment, when electrical power is running through the pin and the sensing element 40 is a resistor and a lighting element, the electrical power is conducted to the fixing sleeve 6 via the tool module 7, and is then conducted to the sensing element 40 of the electrical sensor 4 via the fastening element 42 so as to reduce the current and generate a light. When the sensing element 40 is a non-contact voltage sensor and a buzzer and/or a lighting element, the non-contact voltage sensor detects the pin being leaking electricity at a proper distance and the buzzer and/or the lighting element generates a sound and/or a light to inform the user and prevent the user from receiving an electrical shock. The wire stripper can also be used to detect whether an electrical power device is leaking electricity or not to protect the user.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A multi-functional wire stripper, comprising:
    a fixing element, wherein there is a fixing sleeve on the front end of the fixing element for installing a tool module, and the fixing element has a first pivoting part, a wedged part, and a first pivoting hole;
    a movable element having a second pivoting part, a slot, a switch, and a second pivoting hole, wherein the second pivoting part of the movable element is movably installed at the first pivoting part of the fixing element, the switch is movably installed in the slot, and the switch is movably wedged on the wedged part of the fixing element;
    a wire-stripping module installed between the fixing element and movable element;
    an electrical sensor installed at the fixing element, wherein there is a sensing element in the electrical sensor and the sensing element is connected with the fixing sleeve; and
    a flexible element installed between the first pivoting hole of the fixing element and the second pivoting hole of the movable element.

2. The multi-functional wire stripper as claimed in claim 1, wherein the fixing sleeve is made of metal, the tool module is movably installed in the inner part of the fixing sleeve, and the tool module is a screwdriver or a hexagonal screwdriver.

3. The multi-functional wire stripper as claimed in claim 1, wherein there is a positioning sleeve located at the front end of the fixing element, and the tool module is movably plugged into the positioning sleeve and is connected with the fixing sleeve.

4. The multi-functional wire stripper as claimed in claim 1, wherein the first pivoting part and the second pivot part have the corresponding through holes, and use a pivoting element to pivot with the pair of through holes to install the movable element on the fixing element.

5. The multi-functional wire stripper as claimed in claim 1, wherein on the surface of the fixing element and the movable element, there are slip proof elements.

6. The multi-functional wire stripper as claimed in claim 1, wherein the fixing element has a concave slot, the electrical sensor is screwed in the concave slot, and the sensing element comprises a resistor and a lighting element, or a non-contact voltage sensor and a buzzer and/or a lighting element.

7. The multi-functional wire stripper as claimed in claim 1, wherein the wire-stripping module comprises a pair of first wire-stripping blades, a pair of second wire-stripping blades, and a pair of cutting blades, and the pair of first wire-stripping blades have a plurality of semi-circular blades that correspond to each other and have dimensions that are different from each other.

8. The multi-functional wire stripper as claimed in claim 7, wherein the fixing element and the movable element individually have a long knife slot, a short knife slot, and a blade slot that correspond to each other, the first wire-stripping blades are individually located in the long knife slots, the second wire-stripping blades are individually located in the blade slots, and the cutting blades are individually located in the short knife slots.

9. The multi-functional wire stripper as claimed in claim 8, wherein a semi-circular slot is located at the rear end of the fixing element and the movable element, and the pair of semi-circular slots are adjacent to the pair of blade slots.

* * * * *